United States Patent [19]

Shirai et al.

[11] 4,421,362

[45] Dec. 20, 1983

[54] ANTI-SKID BRAKE CONTROL SYSTEM FOR WHEELED VEHICLES

[75] Inventors: Kenji Shirai; Fumio Nakagawa, both of Susono, Japan

[73] Assignee: Toyota Jidosha Kogyo Kabushiki Kaisha, Toyota, Japan

[21] Appl. No.: 316,276

[22] Filed: Oct. 29, 1981

[30] Foreign Application Priority Data

Nov. 10, 1980 [JP] Japan .................. 55-158459

[51] Int. Cl.³ .............................. B60T 8/02
[52] U.S. Cl. ...................... 303/115; 303/92
[58] Field of Search .............. 188/181 A; 303/6 C, 303/92, 113, 115, 117

[56]  References Cited

U.S. PATENT DOCUMENTS 4,229,049 10/1980 Ando .................. 303/115

Primary Examiner—Duane A. Reger
Attorney, Agent, or Firm—Oblon, Fisher, Spivak, McClelland & Maier

[57] ABSTRACT

In an anti-skid brake control system incorporated with dual hydraulic braking circuits for independently controlling respective braking fluids supplied to the right and left rear-wheel brake cylinders from a tandem master cylinder, an electronic anti-skid brake control apparatus is incorporated with one of the hydraulic braking circuits for decreasing the pressure applied to one of the rear-wheel brake cylinders from the master cylinder in response to an electric signal indicative of a predetermined wheel locking condition, and a modulator valve assembly is incorporated with the other hydraulic braking circuit to cooperate with the anti-skid brake control apparatus so as to control the pressure applied to the other rear-wheel brake cylinder in response to activation of the anti-skid brake control apparatus.

5 Claims, 1 Drawing Figure

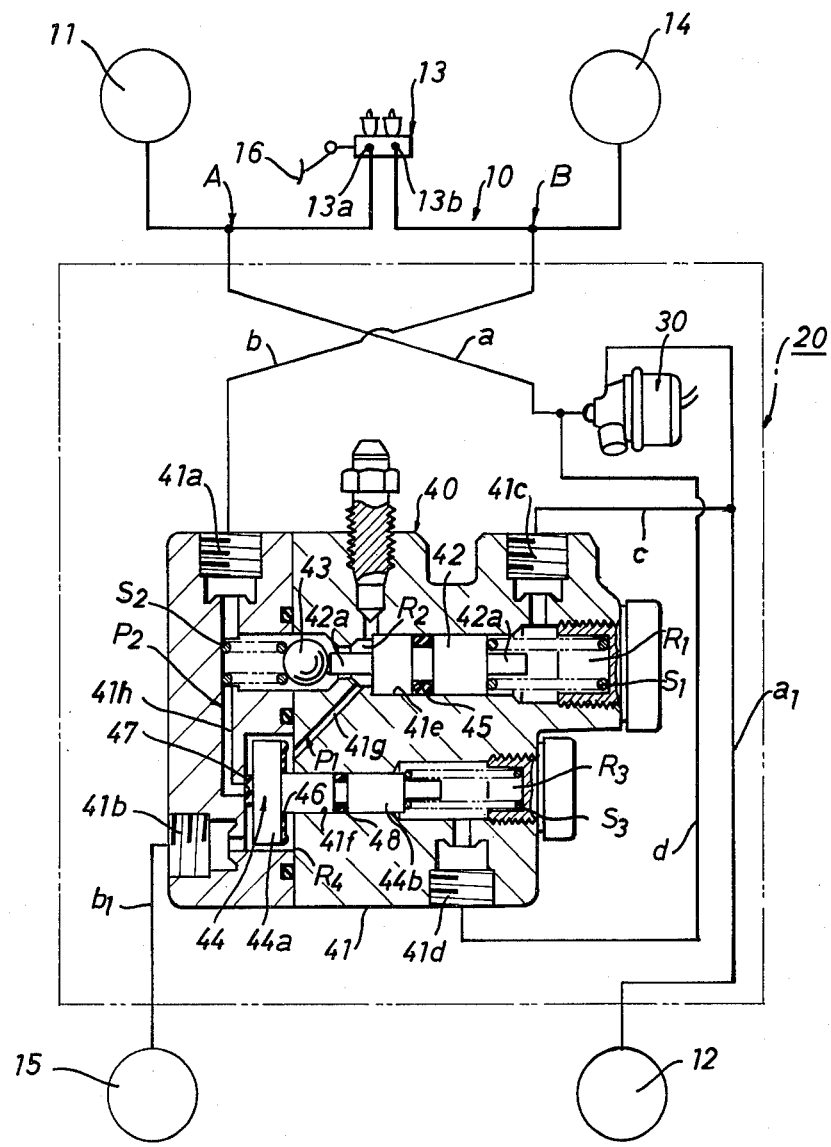

ANTI-SKID BRAKE CONTROL SYSTEM FOR WHEELED VEHICLES

BACKGROUND OF THE INVENTION

The present invention relates to anti-skid brake control systems, and more particularly to an anti-skid brake control system incorporated with dual hydraulic braking circuits for independently controlling respective braking fluids supplied to the right and left rear-wheel brake cylinders at a rate of pressure increase lower than the rate of pressure increase in a tandem master cylinder.

In automobiles, dual hydraulic braking circuits are respectively connected to the right and left rear-wheel brake cylinders to ensure the safety of the automobile, and an electronic anti-skid brake control apparatus is incorporated with each of the braking circuits to avoid skidding of the automobile in sudden braking operation. Such an electronic anti-skid brake control apparatus as disclosed in U.S. Pat. Nos. 3,809,437, 3,830,550, and 4,095,851, comprises a cut-off valve and a hydraulic capacity controller disposed within a hydraulic braking circuit connecting a master cylinder to wheel brake cylinders, wherein in an anti-skid operation, the cut-off valve first blocks passage of pressurized fluid from the master cylinder to the wheel brake cylinders, and then the capacity controller is conditioned for its pressure decreasing operation for effecting the anti-skid operation. The electronic anti-skid brake control apparatus further includes an expensive servomotor for pneumatically actuating the cut-off valve and the capacity controller in response to electric signals from a skid-sensor. In application of the electronic anti-skid brake control apparatus, it is required to incorporate such an expensive servomotor with each of the hydraulic braking circuits, resulting in the increase of the production cost of the control system.

SUMMARY OF THE INVENTION

The primary object of the present invention is to provide an anti-skid brake control system in which a modulator valve is incorporated with one of the dual hydraulic braking circuits and is associated with an electronic anti-skid brake control apparatus adapted to the other hydraulic braking circuit to make the production cost of the control system as lower as possible.

It is another object of the present invention to provide an anti-skid brake control system, having the above-mentioned characteristics, wherein a balance piston in the modulator valve displaces without any loss of its moving stroke to ensure quick braking operation in the occurrence of damage of the other hydraulic braking circuit.

According to the present invention there is provided an anti-skid brake control system for a wheeled vehicle having dual hydraulic braking circuits connecting a tandem master cylinder to the left and right rear-wheel brake cylinders, and an electronic anti-skid brake control apparatus incorporated with one of the hydraulic braking circuits for decreasing the pressure applied to one of the rear-wheel brake cylinders from the master cylinder in response to an electric signal indicative of a predetermined wheel locking condition. The anti-skid brake control system comprises a modulator valve assembly incorporated with the other hydraulic braking circuit to cooperate with the anti-skid brake control apparatus, the modulator valve assembly including a housing provided with inlet and outlet ports respectively in connection to the master cylinder and the other rear-wheel brake cylinder through the other hydraulic braking circuit, a balance piston axially movable within the housing and being exposed at its opposite ends to the pressure respectively applied to the rear-wheel brake cylinders to be moved in an axial direction by the difference in pressure between the rear-wheel brake cylinders, a check valve arranged within the housing to cooperate with the balance piston, the check valve being opened under inoperative condition of the balance piston to permit the flow of pressurized fluid between the inlet and outlet ports and being closed upon movement of the balance piston in the axial direction to interrupt the fluid communication between the inlet and outlet ports, a communication passage formed between the check valve and the outlet port, a bypass passage for providing a direct fluid communication between the inlet and outlet ports, and a change-over valve disposed within the communication passage and being responsive to the respective pressures in the hydraulic braking circuits to permit the flow of pressurized fluid through the communication passage and close the bypass passage under normal condition of the hydraulic braking circuits and to close the communication passage and open the bypass passage in response to braking operation under damage of one of the hydraulic circuits.

BRIEF DESCRIPTION OF THE DRAWING

The above-mentioned objects and features of the present invention will become clear from the following description with reference to the accompanying drawing, in which the single FIGURE is a schematic illustration of a vehicle braking system including an anti-skid brake control system in accordance with the present invention.

DESCRIPTION OF THE PREFERRED EMBODIMENT

Referring now to the drawing, an anti-skid brake control system 20 in accordance with the present invention is incorporated with crossed dual hydraulic braking circuits 10, wherein the rear pressure chamber 13a of a tandem master cylinder 13 is connected to the left front-wheel brake cylinder 11 and the right rear-wheel brake cylinder 12 by way of a first braking fluid circuit A, while the front pressure chamber 13b of the tandem master cylinder 13 is connected to the right front-wheel brake cylinder 14 and the left rear-wheel brake cylinder 15 by way of a second braking fluid circuit B. The anti-skid brake control system 20 includes a conventional electronic anti-skid brake control apparatus 30 and a modulator valve assembly 40 associated with the control apparatus 30.

The electronic anti-skid brake control apparatus 30 is interposed between fluid conduits a and $a_1$ of the first braking fluid circuit A to be activated in response to a predetermined wheel locking condition so as to decrease the pressure in the fluid conduit $a_1$ in connection to the rear-wheel brake cylinder 12. The modulator valve assembly 40 is interposed between fluid conduits b and $b_1$ of the second braking fluid circuit B and includes a housing 41 containing a balance piston 42, a check valve 43, and a change-over valve 44. The housing 41 is provided with an inlet port 41a in connection to the fluid conduit b, an outlet port 41b in connection to the left rear-wheel brake cylinder 15 through the fluid conduit $b_1$, a first pilot port 41c in connection to the fluid conduit $a_1$ through the bypass conduit c, and a second pilot port 41d in connection to the fluid conduit a through a second bypass conduit d.

Formed within the housing 41 are first and second axial bores 41e and 41f in parallel to each other, the first axial bore 41e being in open communication with the inlet port 41a and the first pilot port 41c at its left and right ends, and the second axial bore 41f being in open communication with the outlet and second pilot ports 41b and 41d at its left and right ends. The balance piston 42 and the check valve 43 are coaxially disposed within the first axial bore 41e, and the change-over valve 44 is disposed within the second axial bore 41f. The housing 41 is further formed therein with a first fluid passage 41g, which is communicated at its upper end with the central portion of the first axial bore 41e and at its lower end with a stepped portion of the second axial bore 41f, and with a second fluid passage 41h, which is communicated at its upper end with the left end portion of the first axial bore 41a and at its lower end with the left end of the second axial bore 41f.

The first fluid passage 41g is formed as a portion of a main communication passage $P_1$ which provides a fluid communication between the inlet and outlet ports 41a, 41b, and the check valve 43 and the change-over valve 44 are located in the main communication passage $P_1$. The second fluid passage 41h is formed as a portion of a bypass passage $P_2$ which bypasses the check valve 43 to provide a direct fluid communication between the inlet and outlet ports 41a and 41b.

The balance piston 42 is integrally provided with a pair of rods 42a, 42a taking into account the assembling nature thereof and is axially slidably disposed within the first axial bore 41e through an annular seal member 45 to subdivide the interior of bore 41e into a first fluid chamber $R_1$ in open communication with the first pilot port 41c and a second fluid chamber $R_2$ in open communication with the inlet port 41a through the check valve 43. The balance piston 42 is also loaded by a return spring $S_1$ leftwards to be positioned in engagement with a stepped portion of the axial bore 41e in its inoperative condition to open the check valve 43 by engagement with its left rod 42a. Thus, the balance piston 42 moves leftwards due to the difference in pressure between the first and second fluid chambers $R_1$ and $R_2$ and acts to balance the pressure in both the fluid chambers $R_1$ and $R_2$.

The check valve 43 is loaded rightwards by a compression spring $S_2$ and acts in its rightward movement to cut off the fluid communication between the inlet port 41a and the second fluid chamber $R_2$ so as to interrupt the flow of fluid from the inlet port 41a to the outlet port 41b through the main communication passage $P_1$. The change-over valve 44 is integrally provided at its head 44a with a pair of annular valve members 46, 47 made of synthetic rubber which are arranged to selectively open and close the fluid passages $P_1$ and $P_2$. The change-over valve 44 has a leg portion in the form of a piston 44b which is axially slidably disposed within a small diameter portion of the second axial bore 41f through an annular seal member 48 to subdivide the interior of bore 41f into a third fluid chamber $R_3$ in open communication with the second pilot port 41d and a fourth fluid chamber $R_4$ in open communication with the outlet port 41b. The change-over valve 44 is loaded by a return spring $S_3$ leftwards in its inoperative condition to open the main fluid passage $P_1$ and to close the bypass passage $P_2$. When the third fluid chamber $R_3$ may not be applied with the master cylinder pressure due to damage of the first braking fluid circuit A, the change-over valve 44 is moved rightwards by the master cylinder pressure applied to the fourth fluid chamber $R_4$ through the second braking fluid circuit B such that the valve member 47 opens the bypass passage $P_2$, while the valve member 46 closes the main communication passage $P_1$.

In operation of the embodiment described above, when a brake pedal 16 is depressed to apply the brakes, master cylinder pressure is produced respectively in the front and rear pressure chambers 13b and 13a of the master cylinder 13. The master cylinder pressure in the rear chamber 13a is directly applied to the left front-wheel brake cylinder 11 through the first braking fluid circuit A and applied to the right rear-wheel brake cylinder 12 through the anti-skid brake control apparatus 30 in the first braking fluid circuit A, while the master cylinder pressure in the front chamber 13b is directly applied to the right front-wheel brake cylinder 14 through the second braking fluid circuit B and applied to the left rear-wheel brake cylinder 15 through the modulator valve 40 in the second braking fluid circuit B to effect the braking operation of the automobile. If the anti-skid brake control apparatus 30 is inoperative during the braking operation, the pressure in the first fluid chamber $R_1$ of the modulator valve 40 is substantially equal to the pressure in the second fluid chamber $R_2$ to maintain the balance piston 42 and the check valve 43 in their inoperative positions, as illustrated in the FIGURE. The master cylinder pressure is also applied to the third fluid chamber $R_3$ of the modulator valve 40 through the fluid conduits a and d such that the change-over valve 44 is maintained in its inoperative position to permit the flow of pressurized fluid from the inlet port 41a to the outlet port 41b through the main communication passage $P_1$.

If the anti-skid brake control apparatus 30 is activated to decrease the pressure in the fluid conduit $a_1$ in connection to the right rear-wheel brake cylinder 12 during the braking operation, the decreased pressure is applied to the first fluid chamber $R_1$ of the modulator valve 40 through the bypass conduit c. Then, the balance piston 42 moves rightwards due to the difference in pressure between the first and second fluid chambers $R_1$ and $R_2$, and subsequently the check valve 43 is closed to cut off the fluid communication between the inlet port 41a and the second fluid chamber $R_2$ at the initial stage of the rightward movement of piston 42. At the later stage of the rightward movement of piston 42, the pressure in the second fluid chamber $R_2$ is decreased to apply the decreased pressure to the left rear-wheel brake cylinder 15 through the outlet port 41b and the fluid conduit $b_1$.

If an accident of breakage occurs in the first braking fluid circuit A, the first and third fluid chambers $R_1$ and $R_3$ may not be supplied with the pressurized fluid from the master cylinder 13. As a result, the balance piston 42 is moved by the master cylinder pressure in the second fluid chamber $R_2$ during the braking operation, and the check valve 43 is closed to cut off the fluid communication between the inlet port 41a and the second fluid chamber $R_2$. Simultaneously, the change-over valve 44 is moved rightwards by the pressure in the fourth fluid chamber $R_4$ to open the bypass passage $P_2$ and to close the main communication passage $P_1$. In this instance, the master cylinder in the front chamber 13b of the master cylinder 13 is directly applied to the right front-wheel brake cylinder 14 and applied to the left rear-wheel brake cylinder 15 through the bypass passage $P_2$ of the modulator valve 40 to ensure the braking operation of the automobile. Under such an operating condition as described above, the main communication passage $P_1$ is closed by the change-over valve 44, and change "check valve" balance piston upon the rightward movement of the check valve 42 to restrict the reverse flow of pressurized fluid from the fourth fluid chamber $R_4$ into the second fluid chamber $R_2$. This serves to eliminate any loss of moving stroke of the balance piston 42 thereby to ensure quick braking operation of the automobile.

Although a certain specific embodiment of the present invention has been shown and described, it is obvious that many modifications and variations thereof are possible in light of these teachings. For example, the present invention may be adapted to another type of dual hydraulic braking circuits of which the first braking circuit is arranged to connect a tandem master cylinder to the right front and rear wheel brade cylinders and of which the second braking circuit is arranged to connect the tandem master cylinder to the left front and rear wheel brake cylinders. It is to be understood therefore that within the scope of the appended claims, the invention may be practiced otherwise than as specifically described herein.

What is claimed is:

1. An anti-skid brake control system for a wheeled vehicle having dual hydraulic braking circuits connecting a tandem master cylinder to the left and right rear-wheel brake cylinders, and an electronic anti-skid brake control apparatus incorporated with one of said hydraulic braking circuits for decreasing the pressure applied to one of said rear-wheel brake cylinders from said master cylinder in response to an electric signal indicative of a predetermined wheel locking condition, the anti-skid brake control system comprising a modulator valve assembly incorporated with the other hydraulic braking circuit to cooperate with said anti-skid brake control apparatus, said modulator valve assembly including a housing provided with inlet and outlet ports respectively in connection to said master cylinder and the other rear-wheel brake cylinder through the other hydraulic braking circuit, a balance piston axially movable within said housing and being exposed at its opposite ends to the pressure respectively applied to said rear-wheel brake cylinders to be moved in an axial direction by the difference in pressure between said rear-wheel brake cylinders, a check valve arranged within said housing to cooperate with said balance piston, said check valve being opened under inoperative condition of said balance piston to permit the flow of pressurized fluid between said inlet and outlet ports and being closed upon movement of said balance piston in the axial direction to interrupt the fluid communication between said inlet and outlet ports, a communication passage formed between said check valve and said outlet port, a bypass passage for providing a direct fluid communication between said inlet and outlet ports, and a change-over valve disposed within said communication passage and being responsive to the respective pressures in one of said hydraulic braking circuits to permit the flow of pressurized fluid through said communication passage and close said bypass passage under normal condition of said hydraulic braking circuits and to close said communication passage and open said bypass passage in response to braking operation under damage of the one of said hydraulic braking circuits.

2. An anti-skid brake control system as claimed in claim 1, wherein said housing is provided with a pilot port in connection to the one of said hydraulic braking circuits downstream of said anti-skid brake control apparatus and with an axial bore in open communication with said inlet and pilot ports at its opposite ends, and wherein said balance piston is slidably disposed within said axial bore to subdivide the interior of said axial bore into a first fluid chamber supplied with the pressurized fluid through said anti-skid brake control apparatus and a second fluid chamber supplied with the pressurized fluid through said inlet port.

3. An anti-skid brake control system as claimed in claim 2, wherein said check valve is disposed within said axial bore coaxially with said balance piston to cut off the fluid communication between said inlet port and said second fluid chamber in response to the axial movement of said balance piston.

4. An anti-skid brake control system as claimed in claim 3, wherein said housing is provided with a second pilot port in connection to the one of said hydraulic braking circuits upstream of said anti-skid brake control apparatus and a second axial bore in open communication with said outlet and second pilot ports at its opposite ends, and wherein said change-over valve includes a leg portion in the form of a piston which is slidably disposed within said second axial bore to subdivide the interior of said second axial bore into a third fluid chamber directly supplied with the pressurized fluid through the one of said hydraulic braking circuits and a fourth fluid chamber supplied with the pressurized fluid through said second fluid chamber, said change-over valve further including a head portion integral with said leg portion and housed within said fourth fluid chamber, a pair of valve members secured to opposite faces of said head portion to selectively open and close said communication passage and said bypass passage, and resilient means for loading said leg portion towards said fourth fluid chamber to normally close said bypass passage by engagement with one of said valve members.

5. An anti-skid brake control system as claimed in claim 4, wherein said first and second axial bores are arranged in parallel to each other within said housing.

* * * * *